UNITED STATES PATENT OFFICE.

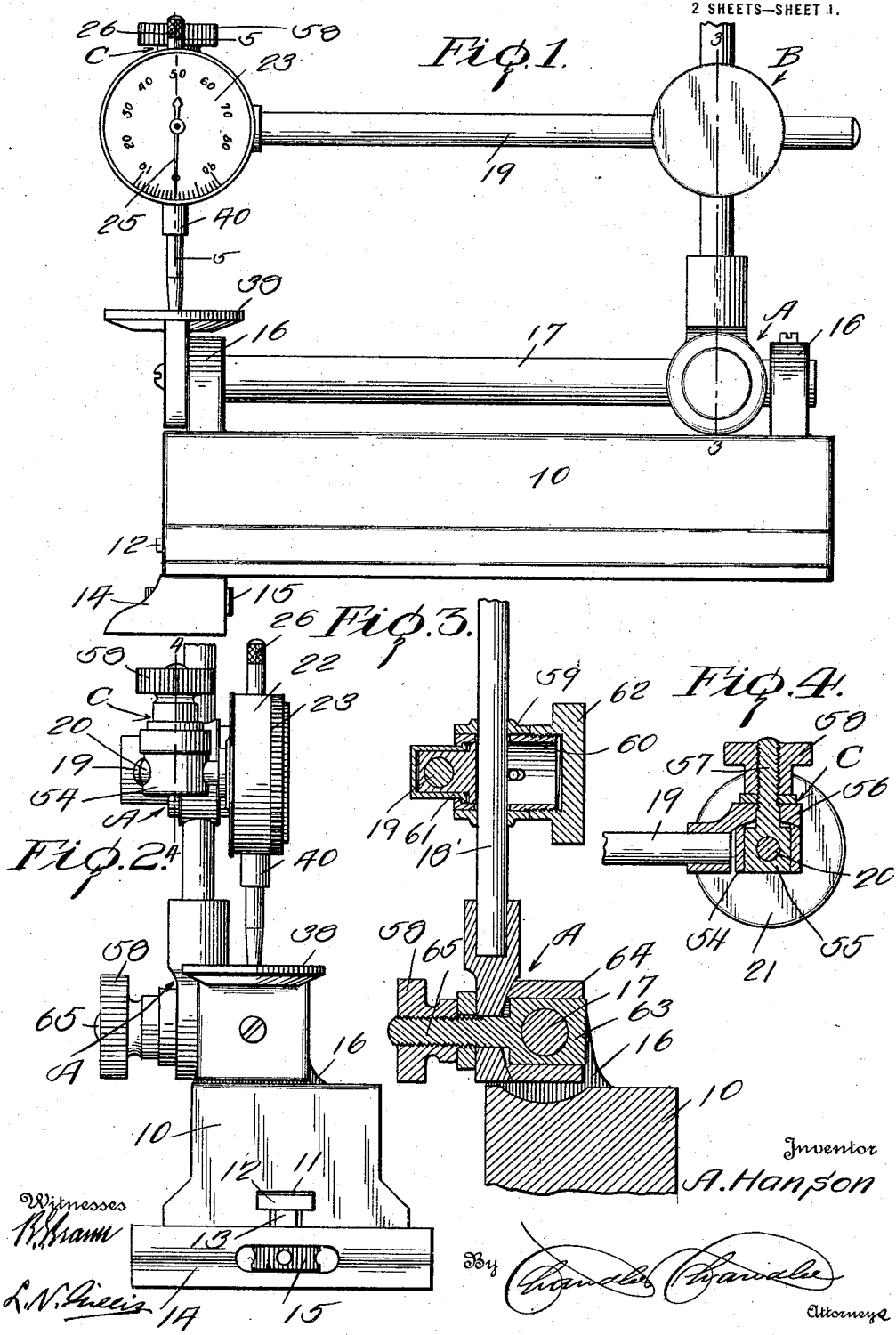

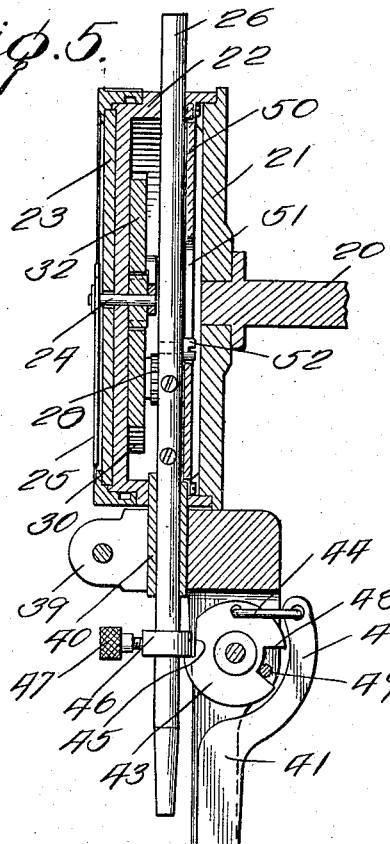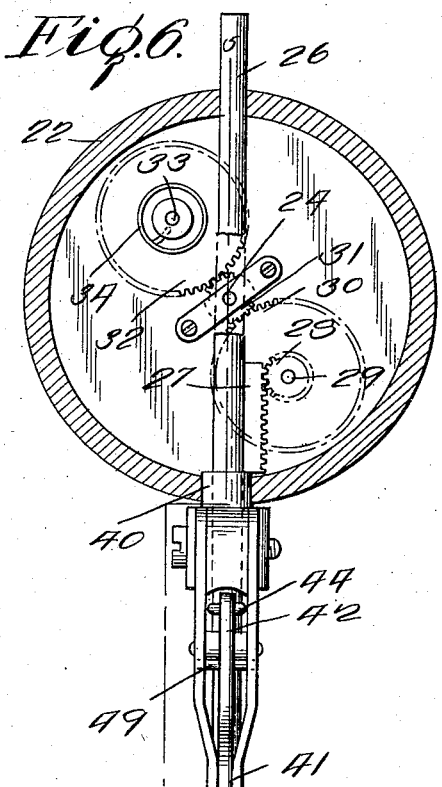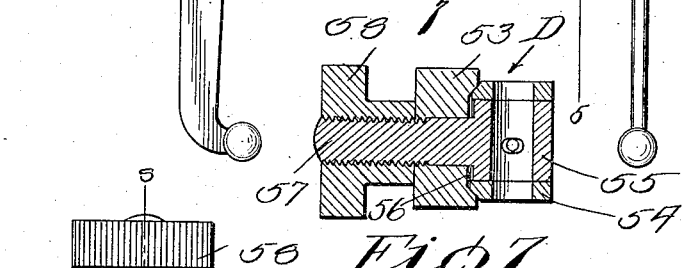

AUGUST HANSON, OF PROVIDENCE, RHODE ISLAND.

MICROMETER-INDICATOR.

1,162,289.  Specification of Letters Patent.  Patented Nov. 30, 1915.

Application filed May 4, 1914. Serial No. 836,295.

*To all whom it may concern:*

Be it known that I, AUGUST HANSON, a citizen of the United States, residing at Providence, in the county of Providence, State of Rhode Island, have invented certain new and useful Improvements in Micrometer-Indicators; and I do hereby declare the following to be a full, clear, and exact description of the invention, such as will enable others skilled in the art to which it appertains to make and use the same.

This invention relates to gages such as are used by machinists and others and has special reference to a gage arranged for detecting minute differences in dimensions.

One object of the invention is to provide an improved gage of this class which will indicate, by simple and improved devices, very minute differences in dimensions.

A second object of the invention is to provide an improved stand for such a gage.

A third object of the invention is to provide an attachment for such a gage which can be used for measuring internal dimensions.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and Figure 1 is a side elevation of the complete device showing the same without the internal attachment. Fig. 2 is an end elevation thereof. Fig. 3 is a section on the line 3—3 of Fig. 1. Fig. 4 is a section on the line 4—4 of Fig. 2. Fig. 5 is a section on the line 5—5 of Fig. 6 showing the internal attachment applied to the gage. Fig. 6 is a view of the gage with the face plate removed so as to show the working parts thereof. Fig. 7 is a detail view of the device used to hold the gage in an ordinary lathe tool post. Fig. 8 is a section on the line 8—8 of Fig. 7.

In carrying out the objects of the invention there is provided base of the character indicated at 10 and in this base is a T-slot 11 adapted to receive the T-head 12 of a clamping bolt 13. This bolt extends into a gage member 14 and on the bolt is a nut 15 which serves to clamp the gage member in adjusted position relative to the base 10. On the base 10 are a pair of lugs 16 and between these lugs 16 extends the rod 17 whereon is slidably and rotatably mounted a clamp, indicated in general at 18, which serves to connect said rod 17 with a second rod 18' and which will be hereinafter more specifically described. On this second rod 18' is slidably and rotatably mounted a clamp B which serves to connect the second rod with a third rod 19, the clamp being hereinafter more specifically described. On the end of the third rod 19 is a certain clamp C of the general nature of the clamp A and B and which serves to connect to the third rod the stem 20 of the indicator.

Mounted on the stem 20 of the indicator is a disk 21 whereto is secured a box 22 having a dial 23 mounted thereon. Journaled centrally in this box 22 is a shaft 24 whereon is carried an indicator hand 25 arranged to travel over the dial 23. Slidable diametrically through this box 22 is a bar 26 which carries a rack 27 meshing with a pinion 28 on a suitable shaft 29 journaled in said box. On this shaft 29 is a gear 30 which meshes with a pinion 31 carried on the shaft 24. Now it will be obvious that any movement of the rod or bar 26 will cause rotation of the hand 25 and consequently force the same to traverse the dial 23.

In practice it is supposed to so proportion the rack, its pinion, and the remaining gears that when a predetermined movement of the bar 26 takes place, such as one thousandth of an inch, the hand will traverse one division on the dial. Thus by proper adjustment of the swiveling clamp 12 the end of the rod 26 may be dropped into contact with any desired object and any variation from true size be readily detected.

In order to return the rack 26 to its original position there is provided a gear 32 which meshes with the gear 31 and which is mounted on a shaft or spindle 33. This shaft or spindle 33 is connected to one end of a spiral spring 34 while the other end of said spring is connected to the box or casing 22 so that when the spindle is rotated the spring will be brought under tension and when the rod 26 is released from outside influence the spring will cause the gear to return said rod to its original position. The spring also takes up lost motion in gear teeth.

On the base is mounted a special table or platform 38 wherewith the bar 26 coöperates in the measurement of thicknesses.

The attachment comprises a clamp member 39 adapted to engage the bar socket 40 which is fixed to the box 22 and pivoted to this clamp member is a lever 41 which has a rearwardly extending arm 42 connected to a rotatable disk 43 by means of a link 44. This disk is notched as at 45 and in the notched portion is held one edge of a collar 46 which is secured on the bar 26 by means of a set screw 47. Thus it will be seen that as the lever 41 is moved the disk 43 will cause backward movement of the bar 26. In order to limit the movement of the disk and prevent injury to the apparatus the disk is provided with a further notch 48 which has a pin 49 located therein, the pin being secured to the clamp and thus limiting the rotation of said disk.

In order to limit movement of the bar 26 the box is provided with a suitable plate 50 having a slot 51 therein and on the bar 26 is a pin 52 which fits in said slot and thus limits the movement of said bar.

In Figs. 7 and 8 are shown the device for using the apparatus with the ordinary tool post. This device consists of a straight bar 53 carrying a clamp indicated in general at D. Each of these clamps C and D consists of a sleeve 54 wherein is mounted a sliding member 55, the sleeve and sliding member being provided with suitable openings for the reception of the rod which it is desired to clamp. This sleeve is received in a suitable socket 56 in the end of the bar to which it is desired to secure the rod and the member 55 is provided with a stem 57 having a threaded end for the reception of the clamp nut 58. In the clamp B there is employed an outer sleeve 59, an inner sleeve 60, and a central member 61 carried slidably by a bushing 61'. The central member 61 and bushing 61' are provided with suitable openings for the reception of the rod 19 while the two sleeves are provided with openings for the reception of the rod 18'. On the inner sleeve is screwed a nut 62 so that when the nut is screwed down the outer sleeve is forced against the rod 18' and the latter against the member 61 and both rods clamped.

The clamp A is provided with a central member 63 and sleeve 64 through which passes the rod 17. There is also provided a stem 65 and this stem passes through an opening in a member secured to the lower end of the rod 18' so that when the nut 58 is screwed on the stem said rods are secured tightly together in any desired position.

The device is used in the ordinary manner for using micrometers and is capable of universal application, the attachment being used when it is desired to operate the device in connection with hollow bodies.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

An attachment for micrometers having a reciprocable bar, comprising a clamp adapted to be secured to the micrometer, a lever pivoted to said clamp, a disk rotatably mounted on the clamp, said disk being provided with oppositely disposed notches in its edge, a collar adjustably mounted on the bar and engaged in one of said notches, a stud on the clamp engaged in the other notch, and a link connecting the lever and disk.

In testimony whereof, I affix my signature, in the presence of two witnesses.

AUGUST HANSON.

Witnesses:
    PETER N. FROBERG,
    CHARLES MANDELL.